(12) United States Patent
Kolbe et al.

(10) Patent No.: US 8,797,190 B2
(45) Date of Patent: Aug. 5, 2014

(54) METHOD FOR DISPLAYING A USER ENTERED FLIGHT PATH

(75) Inventors: Dashiell Matthews Kolbe, Grand Rapids, MI (US); Philip Dewing Sugimoto, Rockford, MI (US); Peter Jacob Conrardy, Tampa, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/558,587

(22) Filed: Jul. 26, 2012

(65) Prior Publication Data

US 2014/0028476 A1 Jan. 30, 2014

(51) Int. Cl.
*G01C 23/00* (2006.01)

(52) U.S. Cl.
USPC .......................... 340/971; 340/973; 340/979

(58) Field of Classification Search
USPC .......... 340/971–973, 978, 979, 980; 701/1, 3, 701/8, 9, 14–16; 244/183, 186; 345/442
See application file for complete search history.

(56) References Cited

U.S. PATENT DOCUMENTS

| | | | |
|---|---|---|---|
| 4,021,009 A * | 5/1977 | Baker et al. | 244/180 |
| 5,155,683 A | 10/1992 | Rahim | |
| 6,097,996 A | 8/2000 | Deker | |
| 6,161,063 A | 12/2000 | Deker | |
| 6,856,864 B1 * | 2/2005 | Gibbs et al. | 701/3 |
| 6,980,892 B1 * | 12/2005 | Chen et al. | 701/9 |
| 7,162,335 B2 * | 1/2007 | He et al. | 701/3 |
| 8,027,756 B2 * | 9/2011 | Davis et al. | 701/8 |
| 8,032,267 B1 * | 10/2011 | Simon | 701/4 |
| 8,423,207 B2 * | 4/2013 | Davis et al. | 701/8 |
| 2002/0183922 A1 | 12/2002 | Tomasi et al. | |
| 2005/0162425 A1 * | 7/2005 | Kyle et al. | 345/442 |
| 2006/0089794 A1 | 4/2006 | DePasqua | |
| 2010/0145552 A1 | 6/2010 | Herman et al. | |
| 2011/0010082 A1 * | 1/2011 | Wilson et al. | 701/200 |

FOREIGN PATENT DOCUMENTS

| | | |
|---|---|---|
| EP | 2031350 A1 | 3/2009 |
| EP | 2136276 A2 | 12/2009 |
| EP | 2362183 A2 | 8/2011 |

OTHER PUBLICATIONS

A Path Based on Third-Degree Polynomials, Constrained at its Endpoints by Position, Orientation, and Speed; G.W. Lucas; Jan. 16, 2006; rossum.sourceforge.net/papers;CalculationsForRobotics/CubicPath.htm; 16 pages.
European Search Report for Counterpart EP13177957.1, Oct. 9, 2013.

* cited by examiner

*Primary Examiner* — Van T. Trieu
(74) *Attorney, Agent, or Firm* — McGarry Bair PC

(57) ABSTRACT

A method for selecting and displaying a flight path for an aircraft on a display of a flight deck of the aircraft that allows a user to input a selected flight path on a map displayed on the display. A final flight path will be displayed on the display of the flight deck that is based on the input of the selected flight path.

18 Claims, 3 Drawing Sheets

METHOD FOR DISPLAYING A USER ENTERED FLIGHT PATH

BACKGROUND OF THE INVENTION

Contemporary aircraft may include a flight management system (FMS). The FMS automates a wide variety of in-flight tasks and one of its primary functions is in-flight management of the flight path. The flight path trajectory may include a plurality of waypoints. The FMS may be capable of receiving input from a pilot regarding such waypoints but such input often needs to be input to the FMS as a data point. A quicker more user friendly interface is desired, which still allows for the FMS to take into account additional data that may modify the route and convey such information to the pilot.

BRIEF DESCRIPTION OF THE INVENTION

In one embodiment, the invention relates to a method of selecting and displaying a flight path for an aircraft on a display of a flight deck of the aircraft includes receiving a trace input indicative of a trace of a selected flight path on a map displayed on the display, generating a final flight path that can be flown by the aircraft from the trace input and performance attributes of the aircraft, and displaying the final flight path on the display of the flight deck.

DESCRIPTION OF EMBODIMENTS OF THE INVENTION

Figure 1:
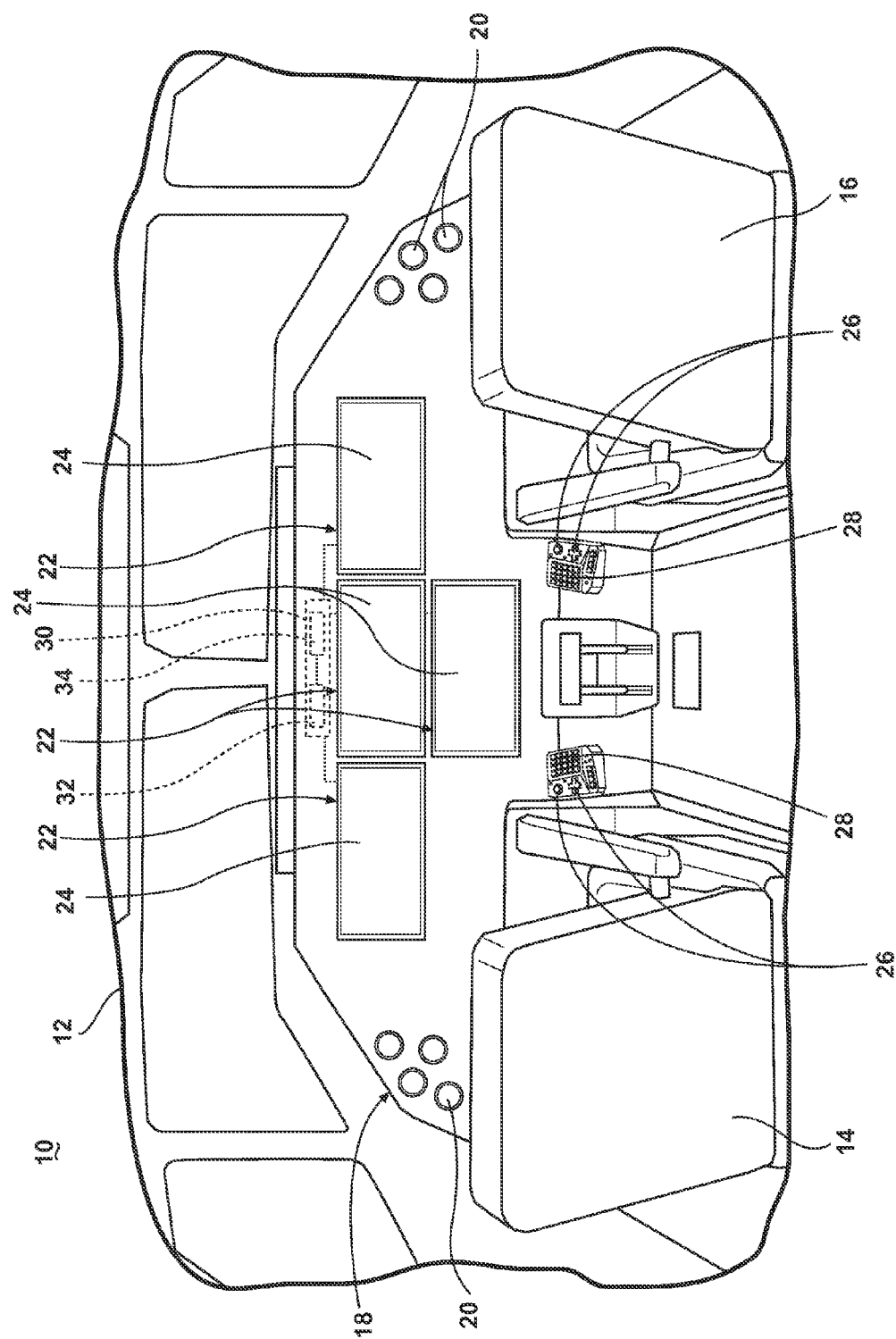
FIG. 1 is a perspective view of a portion of an aircraft cockpit with a flight display on which a flight path may be selected and displayed according to embodiments of the invention.

FIG. 1 illustrates a portion of an aircraft 10 having a cockpit 12. While a commercial aircraft has been illustrated, it is contemplated that embodiments of the invention may be used in any type of aircraft allowing for a flight path to be selected and displayed. A first user (e.g., a pilot) may be present in a seat 14 at the left side of the cockpit 12 and another user (e.g., a co-pilot) may be present at the right side of the cockpit 12 in a seat 16. A flight deck or cockpit instrument panel 18 having various instruments 20 and multiple multifunction flight displays 22 may be located in front of the pilot and co-pilot and may provide the flight crew with information to aid in flying the aircraft 10.

The flight displays 22 may include either primary flight displays or multi-function displays and may display a wide range of aircraft, flight, navigation, and other information used in the operation and control of the aircraft 10. The flight displays 22 may be capable of displaying color graphics and text to a user. The flight displays 22 may be laid out in any manner including having fewer or more displays and need not be coplanar or the same size. A touch screen display or touch screen surface 24 may be included in the flight display 22 and may be used by one or more flight crew members, including the pilot and co-pilot, to interact with the systems of the aircraft 10. It is contemplated that one or more cursor control devices 26, such as a mouse, and one or more multifunction keyboards 28 may be included in the cockpit 12 and may also be used by one or more flight crew members to interact with the systems of the aircraft 10.

A controller 30 may be operably coupled to components of the aircraft 10 including the flight displays 22, touch screen surface 24, cursor control devices 26, and keyboards 28. The controller 30 may also be connected with other controllers (not shown) of the aircraft 10. The controller 30 may include memory, the memory may include random access memory (RAM), read-only memory (ROM), flash memory, or one or more different types of portable electronic memory, such as discs, DVDs, CD-ROMs, etc., or any suitable combination of these types of memory. The controller 30 may include processing units, which may be running any suitable programs to implement a graphical user interface (GUI) and operating system. These programs typically include a device driver that allows the user to perform functions on the touch screen surface 24 such as selecting options, inputting commands and other data, selecting and opening files, and moving icons through the touch screen surface 24. The controller 30 may be a portion of an FMS or may be operably coupled to the FMS.

The controller 30 may include a processor 32 and memory 34. A computer searchable database of information may be stored in the memory 34 and accessible by processor 32. The processor 32 may run a set of executable instructions to display the database or access the database. Alternatively, the controller 30 may be operably coupled to a database of information. For example, such a database may be stored on an alternative computer or controller. It will be understood that the database may be any suitable database, including a single database having multiple sets of data, multiple discrete databases linked together, or even a simple table of data.

The database may store imagery data that may include geo-specific terrain, man-made objects including runway and airport layouts, and additional imagery including aircraft traffic information. It is contemplated that the database may incorporate a number of databases or that the database may actually be a number of separate databases including a terrain database, man-made obstacle database, geo-political database, hydrological database, and other databases. It is contemplated that the controller 30 retrieves and displays an image on the display by generating an image from the information and imagery data obtained from the multiple databases. The database may also include runway data, aircraft performance data or aircraft performance attribute data, engine performance data, current weather conditions, and historical performance data. It is contemplated that at least some of this data may be stored as performance attributes of the aircraft, geographic constraints, and weather constraints.

Alternatively, it is contemplated that the database may be separate from the controller but may be in communication with the controller 30 such that it may be accessed by either the controller 30. For example, it is contemplated that the database may be contained on a portable memory device and in such a case, the flight deck 18 may include a port for receiving the portable memory device and such a port would be in electronic communication with controller 30 such that controller 30 may be able to read the contents of the portable memory device. It is also contemplated that the database may be updated through a communication link and that in this manner, real time information such as information regarding air traffic imagery may be included in the database and may be included in image displayed by the controller 30.

Further, it is contemplated that such a database may be located off the aircraft 10 at a location such as airline or flight operations department control (not shown) or another location and that the controller 30 may be operably coupled to a wireless network (not shown) over which the database information may be provided to the controller 30. For example, the weather data may be obtained from a weather database which may contain real-time weather data or forecasted weather data. Such weather databases may contain information regarding certain weather-related phenomena (e.g., wind speed, wind direction, temperature, among others) and data pertaining to visibility (e.g., foggy, cloudy, etc.), precipitation (rain, hail, snow, freezing rain, etc.) and other meteorological information. Because air temperature, wind direction, and wind speed must be accounted for in trajectory calculations to ensure that the aircraft can accurately conform to the desired trajectory, the weather database may include 3-D real-time temperature and wind models of the local airspace as well as 4-D forecasted data. The weather database may store such real-time or forecasted weather data based at a specific latitude, longitude, and altitude.

Figure 2:
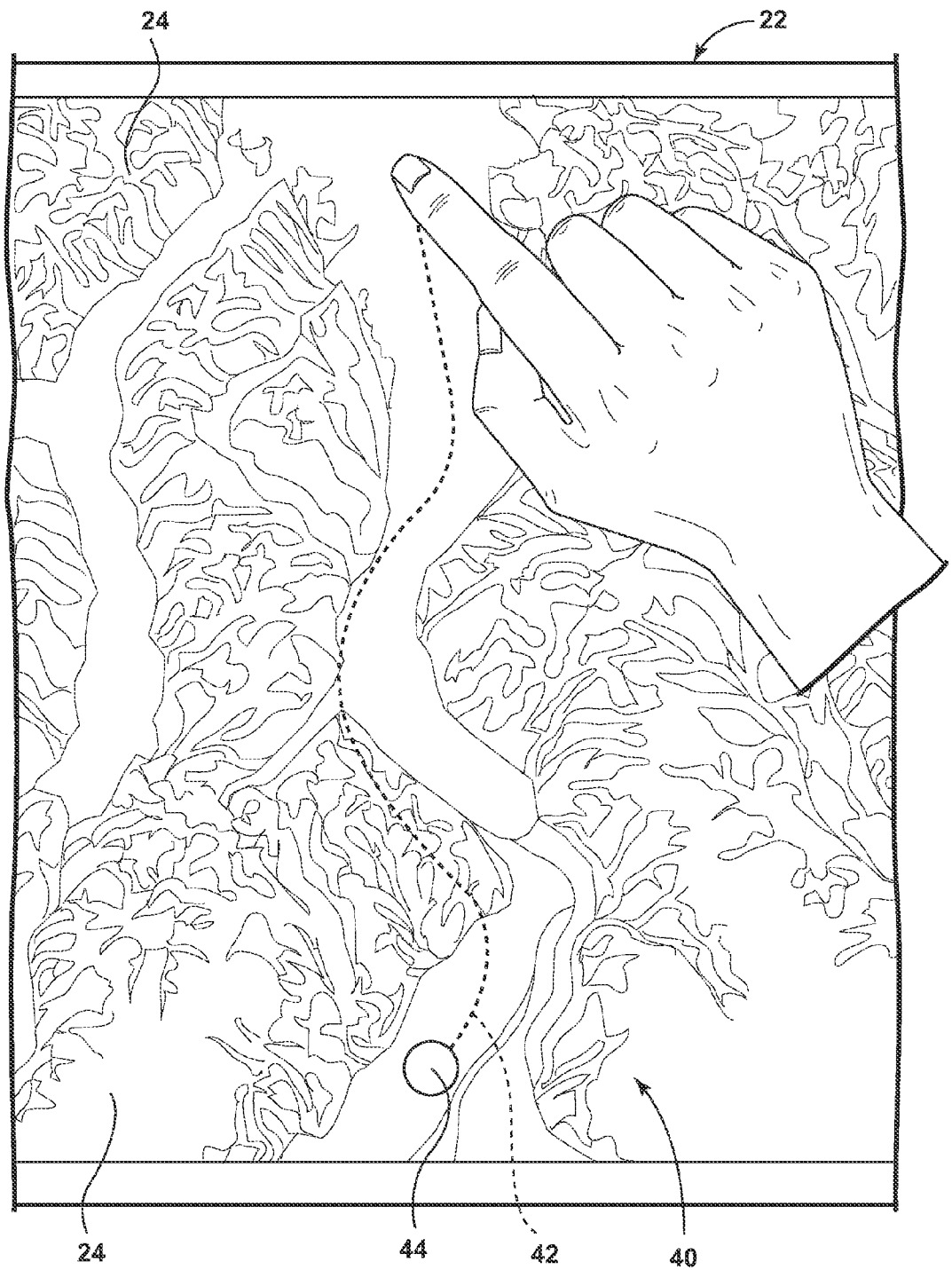
FIG. 2 is a schematic view of a trace input being received according to a first embodiment of the invention.

During operation, the controller 30 may utilize inputs from the pilot, the database, and/or information from airline control or flight operations department to present a graphic depiction of the surrounding of the aircraft 10 or a future surrounding of the aircraft 10 based on waypoint information. For example, as illustrated in FIG. 2, a map 40 may be displayed on the flight display 22. It will be understood that the map 40 may be graphically illustrated in a variety of ways and that various objects, such as the runway, may be illustrated on the flight display 22 to better aid the pilot in making decisions with respect to a flight path selected by the user. Further, the map 40 may take any variety of forms including a 2D map, a 3D map, a topographical map, etc.

A user may then input a selected flight path or traced route, which will be referred to herein as a trace input 42, on the map 40 displayed on the flight display 22 and the trace input 42 may be received by the controller 30. The user may input the selected flight path by tracing the route on the touch screen 24 forming the flight display 22, as illustrated. Alternatively, the user may input the selected flight path by tracing the route using a cursor control device 26. It is contemplated that after the trace input 42 is received by the controller 30 that the controller 30 may update the flight display 22 to illustrate the trace input 42. A waypoint 44 may initially be selected and that the user may input the trace input 42 starting with the waypoint 44.

Figure 3:
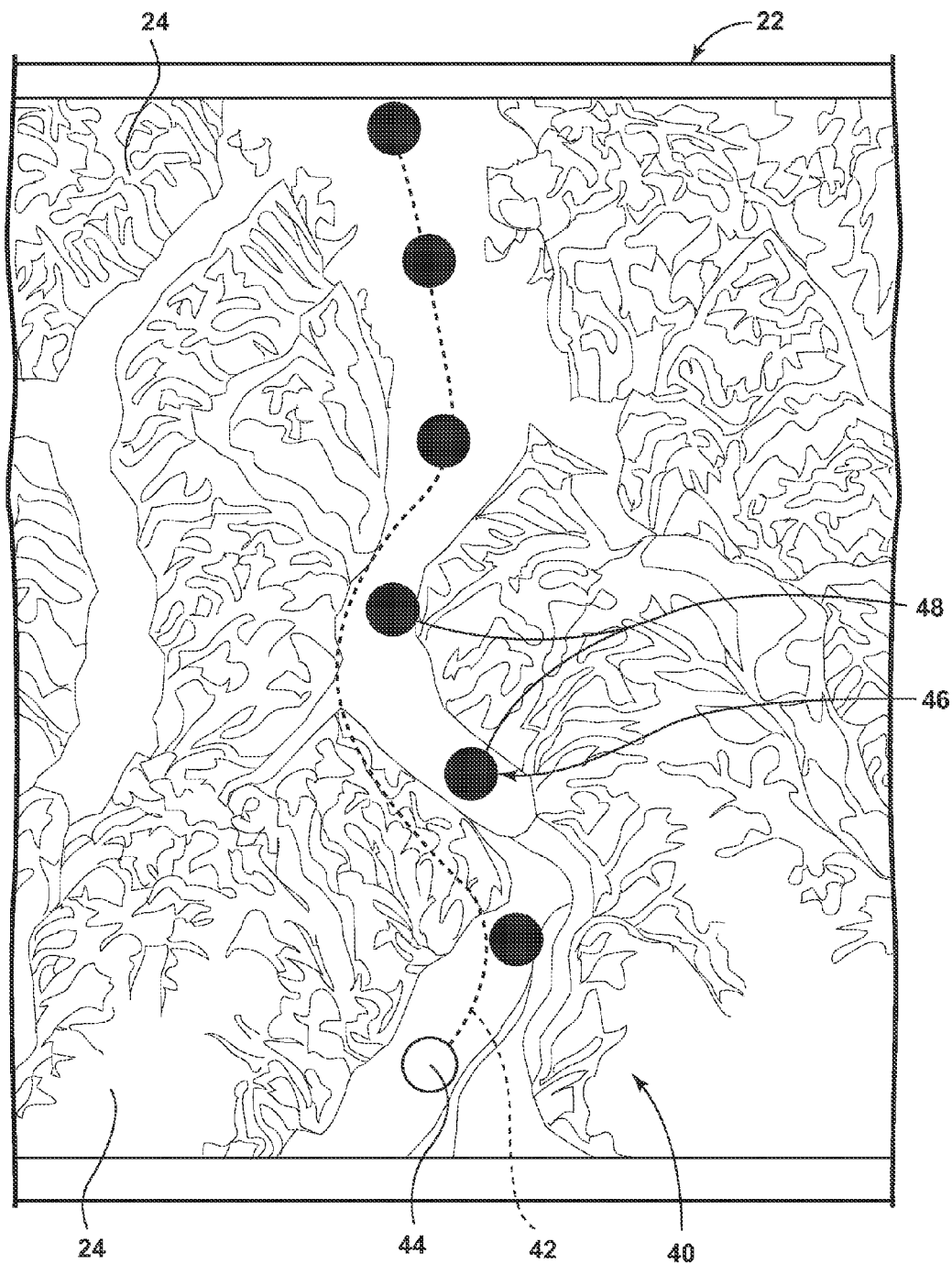
FIG. 3 is a schematic view of a final flight path being displayed based on the trace input of FIG. 2.

Embodiments of the invention generate a final flight path 46 that can be flown by the aircraft 10 from the trace input 42 and performance attributes of the aircraft 10 and display the final flight path 46 on the flight display 22 of the flight deck 18 as illustrated in FIG. 3. The final flight path 46 has been illustrated as a series of waypoints 48. The final flight path may be illustrated in a variety of ways including with curved or straight lines, with or without the inclusion of waypoints. More specifically, embodiments of the invention may use operational characteristics or attributes of the aircraft as well as a database of terrain, weather, and additional information to evaluate the user entered trace as it is entered to determine if aircraft or airspace parameters are being exceeded. If the constraints are being exceeded, the trace input 42 may be adapted to create a final flight path 46 that is attainable.

To generate the final flight path 46, the trace input 42 may be modeled for analysis by the controller 30 and such analysis may be used by the controller 30 to generate a final flight path 46. Modeling the trace input 42 may include modeling the trace input 42 by generating a series of waypoints from the trace input 42. It is contemplated that the trace input 42 may be segmented into a series of waypoints with straight paths. These straight paths may then be converted to curved paths using the performance attributes of the selected aircraft as a basis. In this manner, modeling the trace input 42 may also include modeling the trace input 42 with a curve fit. Any suitable curve-fitting method may be used. This may include extracting data points from the curve fit of the trace input 42 and connecting them with linear segments. It is contemplated that the data points extracted may be a variety of waypoints, which will make up the final flight path 46. In this instance, generating the final flight path 46 may include generating a curve from the data points, with the curve constrained according to the performance attributes of the aircraft 10. Generating the final flight path 46 may include constraining the curve by at least one of geographic constraints and weather constraints, which may be obtained from the databases by the controller 30.

That is, the curved segments and waypoints may be analyzed by the controller 30 to determine if the area surrounding them or the attributes of the aircraft 10 will hinder or prohibit the intended path. In implementation, the one or more constraints may be converted to an algorithm, which may be converted to a computer program comprising a set of executable instructions, which may be executed by the controller 30, which has access to the waypoints entered into the FMS. In this way, one or more particular waypoints and/or segments may be compared to the constraints and a determination may be made if the waypoint and/or segment satisfies the constraints. If so, the waypoint and/or segment may be considered suitable. If the path is unattainable by the aircraft 10, the controller 30 may adapt this set of segments and waypoints to create an attainable curved path and suggest this to the user. The alternated suggested path may be as close to the original traced path as performance, terrain, weather, etc. will allow.

If the final flight path 46 is unattainable based on the information in the databases such as the terrain and the aircraft performance information, the final flight path 46 may be adapted to create an attainable final flight path 46. It is contemplated that the final flight path 46 may be adapted based on any variety of information including at least one of weather, terrain, fixed obstacles, variable obstacles, and flight characteristics of the aircraft to create the attainable final flight path 46.

It is contemplated that in displaying the final flight path 46 on the flight display 22 that the attainable final flight path 46 may be displayed. Such an attainable final flight path 46 may be displayed on the flight display 22 and any changes between the final flight path 46 and the attainable final flight path 46 may be indicated on the flight display 22. The controller 30 may receive approval of such indicated changes before displaying the attainable flight path 46 as the final flight path 46.

Although only one final flight path 46 has been illustrated, the controller 30 may create multiple attainable final flight paths based off of the trace input 42 and the various constrains related to the location of the trace input 42 and attributes of the aircraft 10. The controller 30 may display the multiple attainable final flight paths on the flight display 22. The controller 30 may then determine a user selection of one of the displayed multiple attainable final flight paths. Once the controller 30 has received such a user selection, user selected final flight path 46 may be displayed on the flight display 22.

Again, the final flight path 46 or the attainable final flight path 46 may be curved. This curved path will then be translated back to straight path segments and waypoints. This final path will then be displayed to the user for selection, with any changes in the path highlighted and notated for their approval or modification.

The above described embodiments provide a variety of benefits including that the pilot may quickly input a flight path. The technical effect of the embodiments of the invention being that the pilot is presented with a graphical representation of a final flight path based on the inputted user flight path and that takes into account data that will modify the flight path to account for terrain, weather, and other information such as flight characteristics that may affect the inputted flight path. This may also allow the flight crew to recognize any issues with that flight path in terms of terrain, weather, and other flight characteristics. The above embodiments simplify the pilot interface and allow for time savings in that the user does not have to manually account for this data in selecting a flight path. Instead, the flight path is corrected to account for this data. Current user entered information may result in a disconnect or multiple waypoints with no viable connection between them, which must then be resolved by the user.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for selecting and displaying a flight path for an aircraft on a touch screen display of a flight deck of the aircraft, the method comprising:
   receiving a trace input indicative of a physically traced route on the touch screen display of a selected flight path on a map displayed on the touch screen display;
   generating a final flight path from the trace input and performance attributes of the aircraft wherein the final flight path can be flown by the aircraft; and
   displaying the final flight path on the touch screen display of the flight deck.

2. The method of claim 1, further comprising modeling the trace input for analysis and where such analysis is used to generate the final flight path.

3. The method of claim 2 wherein modeling the trace input includes modeling the trace input by generating a series of waypoints from the input.

4. The method of claim 2 wherein modeling the trace input includes modeling the trace input with a curve fit.

5. The method of claim 4 wherein modeling the trace input with a curve fit comprises extracting data points from the curve fit and connecting them with linear segments.

6. The method of claim 5 wherein the data points are waypoints.

7. The method of claim 5 wherein generating the final flight path comprises generating a curve from the data points, with the curve constrained according to the performance attributes of the aircraft.

8. The method of claim 7 wherein generating the final flight path further comprises constraining the curve by at least one of geographic constraints and weather constraints.

9. The method of claim 8 wherein the performance attributes of the aircraft, the geographic constraints, and the weather constraints are contained in a database.

10. The method of claim 1, further comprising adapting the final flight path to create an attainable final flight path.

11. The method of claim 10 wherein the final flight path is adapted based on at least one of weather, terrain, fixed obstacles, variable obstacles, and flight characteristics of the aircraft to create the attainable final flight path.

12. The method of claim 10 wherein displaying the final flight path on the display of the flight deck comprises displaying the attainable final flight path.

13. The method of claim 10, further comprising creating multiple attainable final flight paths and displaying the multiple attainable final flight paths.

14. The method of claim 13, further comprising determining a user selection of one of the displayed multiple attainable final flight paths.

15. The method of claim 14 wherein displaying the final flight path on the display of the flight deck comprises displaying the determined user selected attainable flight path.

16. The method of claim 10 wherein the attainable final flight path is curved.

17. The method of claim 10, further comprising indicating changes between the final flight path and the attainable final flight path.

18. The method claim 17, further comprising receiving approval of the indicated changes before displaying the attainable flight path.

* * * * *

UNITED STATES PATENT AND TRADEMARK OFFICE
CERTIFICATE OF CORRECTION

PATENT NO. : 8,797,190 B2  
APPLICATION NO. : 13/558587  
DATED : August 5, 2014  
INVENTOR(S) : Dashiell Matthews Kolbe et al.

Page 1 of 1

It is certified that error appears in the above-identified patent and that said Letters Patent is hereby corrected as shown below:

Title Page, item (73) Assignee: "General Electric Company, Schenectady, NY (US)" should be
-- GE Aviation Systems LLC, Grand Rapids, MI (US) --

Signed and Sealed this
Eighteenth Day of August, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,797,190 B2 | Page 1 of 1 |
| APPLICATION NO. | : 13/558587 | |
| DATED | : August 5, 2014 | |
| INVENTOR(S) | : Kolbe et al. | |

It is certified that error appears in the above-identified patent and that said Letters Patent is hereby corrected as shown below:

In the claims

In Column 6, Line 41, in Claim 18, delete "method claim" and insert -- method of claim --, therefor.

Signed and Sealed this
Twenty-second Day of March, 2016

Michelle K. Lee
*Director of the United States Patent and Trademark Office*